United States Patent
Guillou et al.

(10) Patent No.: US 9,889,404 B2
(45) Date of Patent: Feb. 13, 2018

(54) PROCESS FOR CAPTURING A HEAVY METAL CONTAINED IN A MOIST GAS, INTEGRATING A HEAT PUMP TO HEAT THE GAS INTRODUCED INTO A CAPTURE MASS

(71) Applicant: IFP ENERGIES NOUVELLES, Rueil-Malmaison (FR)

(72) Inventors: Florent Guillou, Ternay (FR); Fabien Porcheron, Rueil Malmaison (FR); Karin Barthelet, Lyons (FR); Arnaud Baudot, Vernaison (FR); Yann Lepine, Rueil-Malmaison (FR); Clotilde Jubin, Boulogne Billancourt (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 0 days.

(21) Appl. No.: 14/908,003

(22) PCT Filed: Jun. 17, 2014

(86) PCT No.: PCT/FR2014/051494
§ 371 (c)(1),
(2) Date: Jan. 27, 2016

(87) PCT Pub. No.: WO2015/015068
PCT Pub. Date: Feb. 5, 2015

(65) Prior Publication Data
US 2016/0166983 A1    Jun. 16, 2016

(30) Foreign Application Priority Data
Jul. 31, 2013    (FR) ...................................... 13 57552

(51) Int. Cl.
*B01D 53/64* (2006.01)
*C10L 3/10* (2006.01)
(Continued)

(52) U.S. Cl.
CPC ........... *B01D 53/64* (2013.01); *B01D 53/005* (2013.01); *B01D 53/343* (2013.01); *B01J 20/06* (2013.01);
(Continued)

(58) Field of Classification Search
None
See application file for complete search history.

(56) References Cited

U.S. PATENT DOCUMENTS

| | | | |
|---|---|---|---|
| 5,281,258 A | | 1/1994 | Markovs |
| 2002/0174673 A1* | | 11/2002 | Wilkinson ................ F24D 5/12 62/260 |

(Continued)

FOREIGN PATENT DOCUMENTS

| | | | |
|---|---|---|---|
| CN | 101800500 | * | 5/2012 |
| GB | 2365874 | * | 2/2002 |

(Continued)

OTHER PUBLICATIONS

Translation for Kresnay (2008).*
(Continued)

*Primary Examiner* — Sheng H Davis
(74) *Attorney, Agent, or Firm* — Millen White Zelano and Branigan, PC; John Sopp; Csaba Henter (57) ABSTRACT

Capturing at least one heavy metal, from mercury and arsenic, contained in a moist gas comprising water vapor, by the following steps:

a) heating the moist gas by heat exchange with a compressed heat transfer fluid obtained in step e) in order to obtain a condensed heat transfer fluid and a gas reheated to a temperature Tc;

b) bringing the reheated gas into contact with a heavy metal capture mass in order to obtain a gas depleted in heavy metal;

(Continued)

c) decompressing the cooled heat transfer fluid;
d) cooling the gas depleted in heavy metal by heat exchange with the heat transfer fluid produced in step c) in order to obtain a cooled gas at a temperature Tf, the heat transfer fluid being vaporized;
e) compressing the vaporized heat transfer fluid in a manner such as to obtain a compressed heat transfer fluid, the compressed heat transfer fluid being recycled.

18 Claims, 3 Drawing Sheets

(51) Int. Cl.
B01D 53/34 (2006.01)
B01J 20/06 (2006.01)
B01J 20/30 (2006.01)
B01J 20/32 (2006.01)
B01D 53/00 (2006.01)

(52) U.S. Cl.
CPC ....... *B01J 20/3028* (2013.01); *B01J 20/3204* (2013.01); *B01J 20/3236* (2013.01); *C10L 3/101* (2013.01); *C10L 3/103* (2013.01); *C10L 3/104* (2013.01); *B01D 2251/60* (2013.01); *B01D 2251/602* (2013.01); *B01D 2253/1124* (2013.01); *B01D 2253/1128* (2013.01); *B01D 2256/24* (2013.01); *B01D 2257/60* (2013.01); *B01D 2257/602* (2013.01); *B01D 2259/655* (2013.01); *C10L 3/102* (2013.01); *C10L 3/106* (2013.01); *C10L 2290/06* (2013.01); *C10L 2290/46* (2013.01); *C10L 2290/48* (2013.01); *C10L 2290/542* (2013.01)

(56) References Cited

U.S. PATENT DOCUMENTS

2010/0154419 A1* 6/2010 Kontomaris ........... C09K 5/047
                                                          60/645
2011/0185896 A1  8/2011 Sethna et al.
2013/0090505 A1  4/2013 Catchpole

FOREIGN PATENT DOCUMENTS

| GB | 2365874 A   |   | 2/2002 |
|----|-------------|---|--------|
| GB | 2428598 A   |   | 2/2007 |
| GB | 2466554 A   |   | 6/2010 |
| NL | 1035274     | * | 4/2008 |
| WO | 2010029786  | * | 3/2010 |
| WO | 2011083297 A1 |   | 7/2011 |
| WO | 2011097162 A1 |   | 8/2011 |

OTHER PUBLICATIONS

Translation for Noda (WO 2010/029786) (2010).*
International Search Report and Search Opinion from PCT/FR2014/051494 dated Sep. 18, 2014.

* cited by examiner

PROCESS FOR CAPTURING A HEAVY METAL CONTAINED IN A MOIST GAS, INTEGRATING A HEAT PUMP TO HEAT THE GAS INTRODUCED INTO A CAPTURE MASS

The present invention relates to the field of treatment of gaseous effluents containing heavy metals, in particular effluents of oil origin and their derivatives such as natural gas and synthesis gas. More precisely, the invention concerns the capture of heavy metals, in particular mercury or arsenic, which are present in a moist gaseous effluent, with the aid of a process that firstly can be used to reduce the moisture content of the gas, then secondly to partially purify the dehumidified effluent using a heavy metal capture technology.

Mercury is a metallic contaminant which is found in gaseous or liquid hydrocarbons produced in many regions of the world such as the Gulf of Niger, South America, North Africa or the Asia-Pacific region.

The elimination of mercury from hydrocarbons is desirable from an industrial viewpoint for a number of reasons. Firstly, the presence of mercury in those hydrocarbons is a risk to operators working in contact with these substances because mercury is toxic. In its elemental form, mercury is volatile and runs severe risks of neurotoxicity by inhalation. In its organic form, mercury gives rise to risks which are similar to neurotoxicity by skin contact. Secondly, the presence of mercury in hydrocarbons has a deleterious effect on conventional processing operations which are intended to upgrade those hydrocarbons. Conventionally, the hydrocarbons undergo catalytic reactions such as selective hydrogenation of the olefins produced by steam cracking or catalytic cracking of liquid hydrocarbons. However, the catalysts used, generally comprising noble metals such as platinum and palladium, may be deactivated by the mercury. In fact, mercury induces sintering of the catalysts by amalgamating with nanoparticles of noble metals. The reduction in the specific surface area of the catalysts leads to a very substantial loss of their catalytic activity.

Finally, it is important to eliminate mercury because its presence may cause problems with corrosion of the cryogenic aluminium-based heat exchangers, which could give rise to serious industrial consequences.

For these reasons and more, it is desirable to eliminate or at least reduce the concentration of mercury in the gaseous hydrocarbon effluents.

Industrially, the elimination of mercury from gaseous effluents is carried out by moving the effluent to be treated through mercury guard beds (or demercuration units) filled with adsorbent materials, otherwise known as capture masses.

The impurity to be eliminated, in this case mercury, is then irreversibly retained, preferably by chemisorption, within or at the surface of the capture mass and the effluent evacuated from the bed of capture mass is thus purified.

In a capture mass, mercury can be captured by reacting the mercury with an active phase based on elemental sulphur. In fact, elemental sulphur S reacts irreversibly with elemental mercury, Hg°, as follows:

$$Hg°(g/l) + S(s) \rightarrow HgS(s) \qquad (1)$$

The term "Hg° (g/l)" means that the mercury is dissolved in a gaseous (g) or liquid (l) fluid phase. In contrast, "(s)" denotes solid phases constituted by the active phase of the capture mass and by the reaction product.

The product formed, HgS, known as cinnabar or meta-cinnabar, is a chemically inert, mineral phase which is a solid over a vast range of temperatures. Thus, the mercury is trapped in the capture mass and the effluent to be treated is purified. Other active phases may be used, such as metallic sulphides, for example copper sulphide (CuS).

Conventionally, capture masses are obtained by methods for impregnating the active phase onto porous activated carbon or alumina type supports, or indeed by co-granulation of the active phase with a binder such as aluminium oxide, for example.

However, these capture masses may suffer from malfunctions when the gaseous effluent to be treated is moist. On the one hand, depending on the active phase selected, it may be leached out by the presence of liquid water or liquid hydrocarbons and be entrained in the stream to be treated, or indeed the binder might react with the water to form a dense and compact phase which will block the movement of the gas. On the other hand, the presence of water at high moisture contents in the vapour form in the gas to be treated may cause the appearance of capillary condensation phenomena on the porous supports used. This phenomenon results in the appearance, at a given temperature, of liquid water at pressures below the saturated vapour pressure of water ($P_0$). For a pore model with a cylindrical shape, Kelvin's equation (equation 2) can be used to determine the critical pore diameter (Rc) beyond which the pores will be filled with liquid water.

$$Rc = -2\gamma Vm \cos \theta / RT / \log_{10}(P/P_{10}) \qquad (2)$$

in which P is the pressure of the gas, T is the temperature of the gas, R is the perfect gas constant (R=8.314 J·K$^{-1}$·mol$^{-1}$), Vm is the molar volume of water, $\gamma$ is the gas/water surface tension and $\theta$ is the water/solid contact angle. $P/P_0$ corresponds to the definition of the relative humidity of the effluent. The smallest sized pores, in particular micropores (d<2 nm), are thus much more sensitive than mesopores (2<d<50 nm) or macropores (d>50 nm) to the capillary condensation phenomenon (d corresponds to the pore diameter).

The relative humidity of natural gas, also known as the humidity level or the moisture level or moisture content, corresponds to the ratio of the partial pressure of the water vapour contained in the gas over the saturated vapour pressure, also termed the vapour tension, at the same temperature. Thus, it is a measure of the ratio between the water vapour content of the air and its maximum capacity to contain it under these pressure and temperature conditions.

The capillary condensation mechanism may also occur with hydrocarbon vapours or volatile organic compounds.

The presence of capillary condensation has a major impact on the function of the capture mass, since it causes the appearance of a large resistance to the transfer of material in the bed and prevents the mercury from accessing the whole of the active phase. Very frequently, the performances of the guard bed are then substantially altered. A drop in performance of sulphur on activated carbon type capture masses has thus been observed over the nocturnal operation range of the guard bed. This malfunction is attributed to a drop in the temperature of the reactor at night, which causes the appearance of capillary condensation in the bed. Similarly, it has been shown that for a model gas (mercury in nitrogen) with a relative humidity of 10%, the performances of the capture mass based on sulphur deposited on an activated carbon are reduced by 25%.

Thus, it is important to place the mercury guard bed at an appropriate location in the chain of the process in order to operate the unit in an optimized manner. In general, for natural gas working, the gas is extracted from the geological medium on production wells. At the outlet from the production wells, the natural gas is charged with water and liquid hydrocarbons (condensates). Thus, a three-phase stream is obtained, composed of gas, liquid and sludge, which is channelled to a unit for trapping sludge which is usually known as a slug catcher. In general, the slug catcher is in the form of tubes disposed at a specific inclination which can be used to control the flow of the mixture and deposit the sludge.

At the outlet from this unit, the mixture is sent to a separator known as a primary separator. Thus, three phases are obtained: water, condensates and gas. The gas obtained from the primary separator is sent to a coalescer which causes the entrained liquid to fall towards the primary separator. At the outlet from the coalescer, the gas is theoretically just at its saturation point, but in practice, entrained liquid is frequently present to a greater or lesser extent, usually in the form of droplets in suspension in the gas, depending on the performance of the installed coalescer. The gas is then deacidified, generally using a unit for eliminating acid gases—generally by an amine treatment—which can be used to selectively eliminate $H_2S$ and $CO_2$. The treated gas then passes into a drying unit for reducing the moisture content to values of a few ppm. The natural gas may be dried exclusively by contact with a glycol solution or by movement in a bed of adsorbents.

The mercury guard bed is very often placed in the chain of the process after these driers. The gas has been dried to a substantial extent, and so the guard bed can be operated under favourable conditions, in particular avoiding problems with capillary condensation in the mercury adsorbing material. However, these drying units often use glycol type compounds in which the mercury can dissolve. Document WO2005/047438 in particular demonstrates that the concentration of mercury in the glycol may reach high values, of the order of 2.9 ppm. During the regeneration step, the glycol solution is heated to temperatures close to T=200° C., and thus some of the mercury is discharged into the atmosphere.

Another solution, proposed in U.S. Pat. No. 5,223,145, consists of a process for eliminating both mercury and water. In that layout, a first bed of molecular sieve is used to eliminate water and mercury jointly. When the efficiency of purification decreases, the stream is directed to a second bed of regenerated molecular sieve. The first bed is then regenerated by passing a hot dry gas through the inlet to the column in order to generate a moist gas polluted with mercury at the outlet from this column. This regeneration gas must then itself be treated by the guard bed in order to eliminate the mercury. This solution is particularly unsuitable, because on the one hand it only transfers the problem from one effluent to another, and on the other hand it necessitates a) frequent regeneration of the adsorbers at a temperature which is difficult to reach at a gas treatment plant and b) it requires recourse to a second system for the elimination of mercury which cannot be regenerated, which further increases the associated investment costs.

Another solution proposed in U.S. Pat. No. 5,120,515 consists of disposing desiccants for eliminating water in the same column, and aluminas impregnated with an active phase in order to capture mercury. This solution is also not economically viable, as it is necessary to regenerate the desiccants periodically, incurring overcosts. In addition, mention is made in that patent that that regeneration step gives rise to discharges of mercury which thus have to be re-processed by another demercuration unit.

In addition, positioning the mercury guard bed downstream of the drying device results in contamination of the mercury of the whole process chain upstream of the guard bed. Even if the mercury guard bed were to be positioned between the deacidification and dehydration units, the whole of the process chain upstream of the guard bed, in particular the amines treatment unit, would be polluted with mercury.

It is possible to place the mercury guard bed as far upstream as possible on the process chain, for example after the coalescer. This position, however, gives rise to a number of disadvantages.

If the coalescer is not very efficient or even damaged, continuously entrained liquid (water and condensates) could be supplied to the demercuration unit.

Furthermore, even at saturation, heat losses in the line between the coalescer and the demercuration unit may generate condensation. Particularly if the line is long, if it rains or it is cold, because the line is not insulated, the demercuration unit will receive even more liquid.

Finally, there is a phenomenon of retrograde condensation, a peculiarity of natural gas thermodynamics, generating condensation during the isothermal reduction in pressure of natural gas. In practice, the pressure drops in the line, but in particular in the demercuration unit, may generate partial condensation of water and hydrocarbon condensates.

The most direct solution thus consists of reducing the moisture content of the moist gas by superheating the natural gas, for example by providing a superheater. However, in view of the flow rates routinely encountered in natural gas units, this solution turns out to be very expensive energetically and, as a result, financially.

The aim of this invention is to propose an optimized process for the treatment of moist gas which means that the heavy metal guard bed can be placed downstream of a gas-liquid separator, for example a coalescer, and preferably upstream of the step for the elimination of acid gases, while providing for an optimized function of the heavy metal capture masses, by carrying out a partial dehumidification of the moist gas obtained from the gas-liquid separator.

The Applicant has astutely discovered that integrating a heat pump circuit with a capture mass means that, for a minimal expenditure of energy, the problems raised above can be solved by guaranteeing a sufficiently low relative humidity to avoid condensation problems and, a fortiori, capillary condensation, on the heavy metal capture masses.

In general, the invention describes a process for capturing at least one heavy metal, selected from mercury and arsenic, contained in a moist gas comprising water vapour, in which the following steps are carried out:

a) heating the moist gas by heat exchange with a compressed heat transfer fluid obtained in step e) in order to obtain a condensed heat transfer fluid and a gas reheated to a temperature Tc;

b) bringing the reheated gas obtained in step a) into contact with a heavy metal capture mass in order to obtain a gas which is depleted in heavy metal;

c) decompressing the cooled heat transfer fluid obtained in step a);

d) cooling the gas depleted in heavy metal by heat exchange with the heat transfer fluid produced in step c) in order to obtain a cooled gas at a temperature Tf, the heat transfer fluid being vaporized during step d);

e) compressing the vaporized heat transfer fluid obtained in step d) in a manner such as to obtain a compressed heat transfer fluid, the compressed heat transfer fluid being recycled to step a).

In accordance with the invention, before carrying out step a), a heat exchange may be carried out between the moist gas and the gas depleted in heavy metal obtained from step b).

The temperature Tc may be determined in a manner such that the reheated gas obtained in step a) has a relative humidity of less than 90%.

The difference between Tc and Tf may be less than 50° C.

In particular to capture mercury, the capture mass may comprise an active phase selected from at least one metallic sulphide based on a metal selected from the group constituted by copper (Cu), chromium (Cr), manganese (Mn), iron (Fe), cobalt (Co) and nickel (Ni).

Alternatively, the capture mass may comprise an active phase composed of elemental sulphur.

When the gas contains $H_2S$, the capture mass may comprise an active phase composed of at least one metallic oxide precursor of a metal selected from copper (Cu), chromium (Cr), manganese (Mn), iron (Fe), cobalt (Co) and nickel (Ni).

In particular in order to capture arsenic, the capture mass may comprise an active phase composed of a metallic oxide of a metal selected from copper (Cu) and lead (Pb).

The active phase may be distributed over a porous support, the porous support being selected from the group constituted by aluminas, phosphorus-containing aluminas, silica-aluminas, silicas, clays, activated carbons, zeolites, titanium oxides, zirconium oxides and mixtures thereof.

The heat transfer fluid may be selected from hydrocarbons containing 1 to 7 carbon atoms and optionally one or more heteroatomic ligands.

At least one of the following operations may be carried out:
  before carrying out step e), carrying out a supplemental step for heating the vaporised heat transfer fluid obtained in step d);
  before carrying out step b), carrying out a supplemental step for heating the reheated gas obtained in step a);
  before carrying out step c), carrying out a supplemental step for cooling the cooled heat transfer fluid obtained in step a).

Exchange of heat from the vaporized heat transfer fluid obtained in step d) with the cooled heat transfer fluid obtained in step a) may be carried out.

The moist gas may be selected from one of the following gases: a natural gas, a shale gas, a coal gas, a synthesis gas, combustion fumes, a gaseous hydrocarbon effluent, chloralkali plant exhaust gases, and rare earth production plant exhaust gases.

In the case of a natural gas, before carrying out step a), the following steps may be carried out:
  extracting a natural gas from an underground deposit; then
  introducing the natural gas into a sludge-eliminating device; then
  introducing the natural gas into a gas-liquid separation device then sending the natural gas to step a);
then, after step e), the following steps may be carried out:
  eliminating at least a portion of the $H_2S$ and $CO_2$ contained in the gas depleted in heavy metal; then
  eliminating at least a portion of the water vapour contained in the gas depleted in heavy metal.

BRIEF DESCRIPTION OF THE DRAWINGS

Other characteristics and advantages of the invention will become more apparent from the following description made with reference to the accompanying drawings, in which.

The present invention consists of controlling the relative humidity of a moist gas by increasing the temperature upstream of the capture mass in a manner such as to avoid capillary condensation. In order to minimize the energy to be supplied to the moist gas to be treated, a charge-effluent thermal integration is carried out around the capture mass in a manner such that the hot treated moist gas obtained from the capture mass reheats the cold moist gas entering the capture mass. In order to provide the complement of the heat and to be able to precisely control the relative humidity of the moist gas, heat from the cooled treated gas is transferred downstream of the feed-effluent exchanger to the reheated moist gas downstream of the feed-effluent exchanger and upstream of the capture mass using a heat pump system. The thermal integration of the invention may be carried out either using a heat pump system alone or using a feed-effluent exchanger around the capture mass supplemented by a heat pump system.

Figure 1:
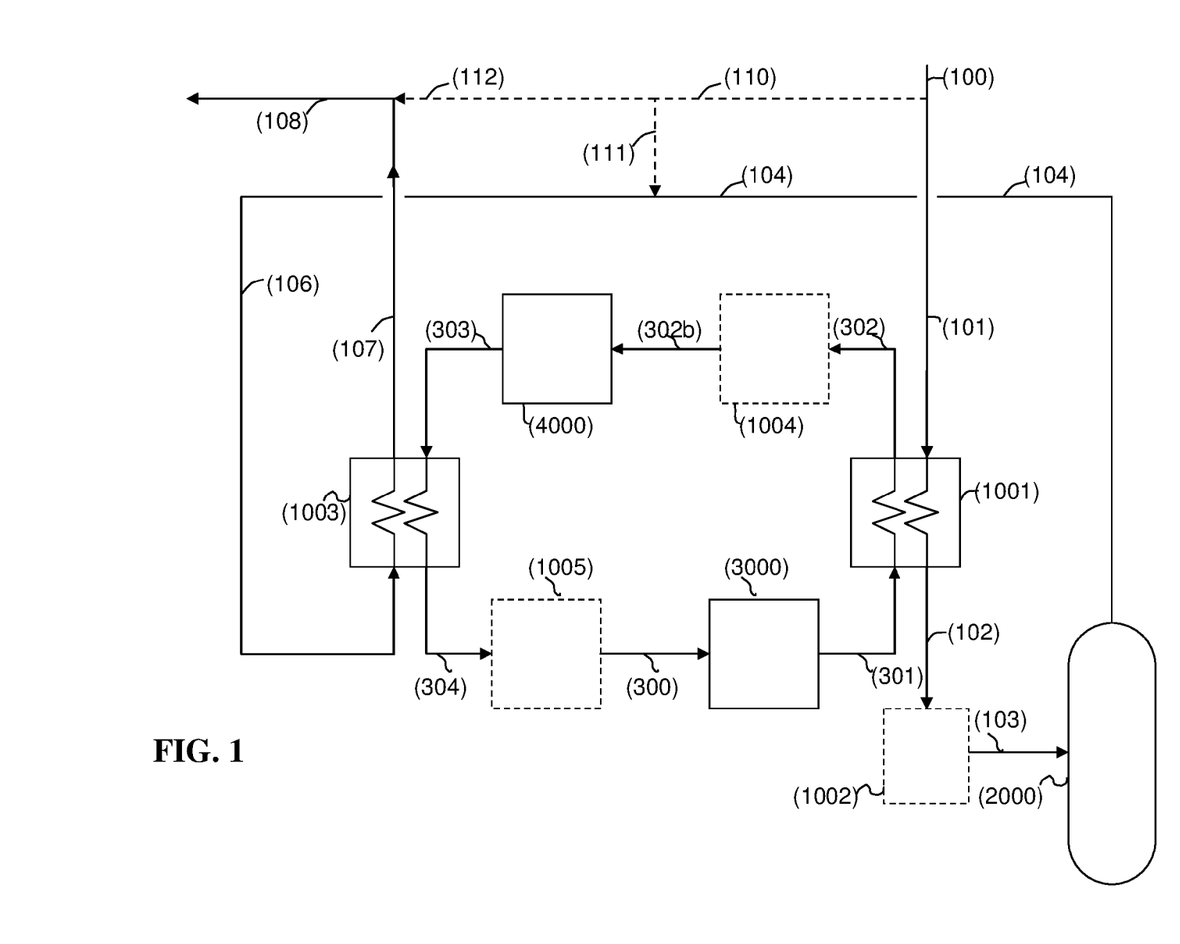
FIG. 1 represents the process for the reduction of the partial pressure of water vapour of a moist gas in accordance with the invention.

Referring to FIG. 1, the moist gas arrives via the conduit 100. The gas arriving via the conduit 100 may be at a pressure in the range 2 to 10 MPa, preferably at a pressure in the range 5 to 9 MPa, and at a temperature in the range 20° C. to 80° C., preferably at a temperature in the range 25° C. to 70° C. The moist gas comprises water vapour, for example at a relative humidity in the range 30% to 100%. The moist gas also comprises at least one heavy metal, for example mercury and/or arsenic, in proportions which may vary between 10 nanograms and 1 gram of mercury per $Nm^3$ of gas.

Depending on the selected configuration and the site conditions, it may be selected to treat all or a portion of the moist gas in order to reduce its partial pressure of water. If only a portion is treated, the treated portion will be the stream moving in the conduit 101 and the untreated portion will be the stream evacuated via the conduit 110. The distribution between the streams 101 and 110 will be determined such that the treated stream moving in the conduit 104 and the untreated stream moving in the conduit 110, when they are combined, provide a gas which is depleted in heavy metals, in particular in mercury, to below an acceptable limit. Preferably, the whole feed is treated and the stream 110 is zero.

The stream of water-saturated gas arriving via the conduit 101 is reheated using a heat exchanger 1001 by heat exchange with the heat transfer fluid of the heat pump system arriving via the conduit 301. This exchange of heat is preferably carried out in counter-current mode. The heat transfer fluid is condensed in the heat exchanger 1001. Optionally and in a complementary manner, the reheated gas obtained from the heat exchanger 1001 via the conduit 102 may be reheated using a heat exchanger 1002 in order to obtain a relative humidity which is suitable and to avoid capillary condensation of water on the capture mass 2000. The heat exchanger 1002 may, for example, be a heat exchanger with an external heat source such as a hot oil circuit, or fumes obtained from a furnace, or a burner. The gas arriving via the conduit 101 may be heated to a value in the range 1° C. to 20° C., preferably in the range 2° C. to 10° C. In this case, the relative humidity of the gas obtained from the heat exchanger 1002 via the conduit 103 is satisfactory. Preferably, there is no need for complementary heat to be provided via 1002 because the gas moving in the conduit 102 satisfies the relative humidity specifications. In this case, the conduit 102 is connected directly to the conduit 103. Preferably, in accordance with the invention, the gas is heated in 1001, optionally with supplemental heating in 1002, in a manner such that the gas has a relative humidity of less than 90% of saturation, preferably less than 80% and highly preferably less than 75% of saturation. This threshold for the moisture content depends on the pore characteristics of the heavy metal capture mass.

The moist and reheated gas moving in the conduit 103 is brought into contact with the heavy metal guard bed or capture mass 2000. This produces a heavy metal-depleted gas evacuated from the capture mass 2000 via the conduit 104.

All or a portion of the untreated fraction of the gas moving in the conduit 110 may be mixed via the conduit 111 with the treated gas arriving via the conduit 104 in order to produce the mixture moving in the conduit 106. The stream moving in the conduit 106 is at a temperature above the initial temperature of the gas arriving via the conduit 100 and thus has the capacity to give up yet another part of its heat. In accordance with the invention, a portion of the heat from the stream 106 is supplied to the heat pump system in a heat exchanger 1003: the stream 106 is cooled by heat exchange in 1003 with the heat transfer fluid arriving via the conduit 303 in order to generate a vaporized fluid evacuated via the conduit 304. The gas cooled in the heat exchanger 1003 is evacuated via the conduit 107, which may then be mixed with a fraction of untreated gas arriving via the conduit 112 in order to form a gas which is depleted in heavy metal evacuated via the conduit 108. The gas arriving via the conduit 104 may be cooled to a value in the range 1° C. to 20° C., preferably in the range 2° C. to 10° C.

The guard bed 2000 is composed of capture masses which have the capacity to adsorb a heavy metal. It is possible to use any type of capture mass which is known to the skilled person. The capture mass employed may be selected from those known to the skilled person. The capture mass comprises a compound, usually known as the active phase, which reacts with the mercury in order to capture the heavy metal on the capture mass. The capture mass is preferably in the form of a bed composed of granules.

In particular to capture mercury, the active phase of the capture mass may comprise metals which react with mercury in their sulphide form. The metallic sulphide or sulphides contained in the capture mass of the invention are based on a metal selected from the group constituted by copper (Cu), chromium (Cr), manganese (Mn), iron (Fe), cobalt (Co) and nickel (Ni). Preferably, the metal or metals of the metallic sulphide or sulphides are selected from the group constituted by copper (Cu), manganese (Mn), iron (Fe) and nickel (Ni). Highly preferably, if a single metallic sulphide is present, copper sulphide is selected.

The active phase used may also be elemental sulphur, for example as described in the patent document FR 2 529 802.

The mercury guard bed is disposed upstream of the deacidification units (for example an amine unit), and so the gas to be treated contains $H_2S$. Thus, it is also possible to use the metallic oxide precursor, the metal being selected from the group constituted by copper (Cu), chromium (Cr), manganese (Mn), iron (Fe), cobalt (Co) and nickel (Ni), preferably copper oxide, which can be used to jointly eliminate $H_2S$ and mercury by being sulphided by $H_2S$ in a first step into a metallic sulphide, then by being reacted with mercury.

In order to capture arsenic, and in particular in its gaseous form as $AsH_3$, the active phase of the capture mass may comprise metals which react with arsenic in their oxide form. The metallic oxide or oxides contained in the capture mass of the invention are based on a metal selected from the group constituted by copper (Cu) and lead (Pb). Preferably, if a single metallic oxide is present, copper (II) oxide, also termed cupric oxide (CuO), is used. Highly preferably, if a single metallic oxide is present, lead (II) oxide (PbO) is used.

Preferably, the capture mass may be constituted by an active phase as described above, distributed on a porous support.

The porous support may preferably be selected from aluminas, phosphorus-containing aluminas, silica-aluminas, silicas, clays, activated carbon, zeolites, titanium oxides, zirconium oxides and mixtures thereof.

A capture mass containing a support and copper sulphide is described in the document U.S. Pat. No. 4,094,777, for example.

The capture mass may be obtained using any preparation method which is known to the skilled person, such as impregnation or co-granulation, for example.

Processing the gas treated by the capture mass 5000 is preferably carried out by injecting the effluent to be treated into a reactor containing the capture mass in the form of a fixed bed.

In the equipment 2000, the effluent to be treated may be brought into contact with the capture mass at a temperature in the range −50° C. to 115° C., preferably in the range 0° C. to 110° C., and more preferably in the range 20° C. to 100° C. Furthermore, it may be carried out at an absolute pressure in the range 0.01 MPa (0.1 bar) to 20 MPa (200 bar), preferably in the range 0.1 MPa (1 bar) to 15 MPa (150 bar), and more preferably in the range 0.1 MPa (1 bar) to 12 MPa (120 bar).

In addition, this step for bringing the effluent to be treated into contact with the capture mass may be carried out at a HSV in the range 0.1 $h^{-1}$ to 50000 $h^{-1}$. The term "HSV" means the hourly space velocity of the gaseous effluent in the capture mass, i.e. the volume of gaseous effluent per volume of reactor per hour. For a gaseous effluent to be treated, the HSV may preferably be in the range 50 $h^{-1}$ to 500 $h^{-1}$.

Contact with the capture mass may advantageously be carried out in order to capture the heavy metals, in particular mercury, contained in the effluent to be treated, and to obtain an effluent with a reduced heavy metals content, in particular of mercury, compared with the initial content of the effluent, or even to totally eliminate the heavy metals from the effluent.

Advantageously, the reduction in the total content by weight of heavy metal between the gaseous effluent before treatment and the effluent obtained after treatment with the capture mass may represent at least 90%, preferably at least 95% and more preferably at least 99%.

The heat pump circuit uses a heat transfer fluid. The heat transfer fluid supplying the heat pump circuit may be selected from the group formed by refrigerating fluids defined by the organization known as ASHRAE in the document Standards 34-2010.

The refrigerating fluid is preferably selected from the group of light hydrocarbons containing 1 to 7 carbon atoms and comprising or not comprising one or more heteroatomic ligands. This group comprises, for example, all alcohols in which the carbon backbone contains 1 to 7 carbon atoms irrespective of whether this backbone is linear or branched, such as methanol, ethanol, propanol, butanol, pentanol, hexanol or heptanol, or the corresponding diols or triols, as well as their isomers. The heat transfer fluid may also contain molecules comprising at least one fluorine or chlorine atom such as, for example, hexaflorocene $C_3F_6$, or chlorofluorocarbon gases such as dichlorodifluoromethane $CCl_2F_2$, or indeed hydrochlorofluorocarbon gases such as chlorodifluoromethane, $CHClF_2$. Still more preferably, the refrigerating fluid comprises at least 80% by weight of at least one of the following elements: propane, butane, pentane, hexane, heptane or any mixture of at least two of the mentioned five elements.

The heat pump circuit is described below. The evaporated and optionally superheated heat transfer fluid may be introduced into the heat exchanger 1005 via the conduit 304 in order to undergo optional supplemental superheating, for example by heat exchange with the condensed heat transfer fluid 302 moving in the conduit 302 (in this case the heat exchangers 1005 and 1004 form a single piece of equipment). The evaporated and optionally superheated heat transfer fluid moving in the conduit 300 is compressed using a compressor 3000, for example a compressor which may be a centrifugal, reciprocating, screw or gear compressor. The choice of the technology depends on the flow rate of the heat transfer fluid and its nature (self-lubricating or not, molar mass, corrosive or non-corrosive nature, etc). Compression raises the temperature and pressure of the heat transfer fluid. The pressurized fluid obtained from the compressor via the conduit 301 is in the vapour form. The fluid 301 is condensed in the heat exchanger 1001 by heat exchange with natural gas arriving via the conduit 101. Condensation in the exchanger 1001 has the effect of moving the heat transfer fluid into the liquid phase and fixing the temperature at the condensation temperature under the selected pressure conditions. This results in the condensed heat transfer fluid being evacuated from the exchanger 1001 via the conduit 302, as a liquid, the temperature of which may optionally be reduced by heat exchange in the heat exchanger 1004, for example by heat exchange with the evaporated heat transfer fluid moving in the conduit 304 (in this case the heat exchangers 1005 and 1004 form one and the same piece of equipment). The condensed and optionally cooled fluid moving in the conduit 302b is decompressed in equipment 4000 producing a pressure drop, for example a valve or a reduction orifice, in order to produce the decompressed fluid moving in the conduit 303. The decompressed fluid has undergone partial evaporation, which causes a reduction in its temperature. The partially evaporated fluid is evaporated and optionally superheated by heat exchange with the natural gas depleted in mercury arriving via the conduit 106 in the heat exchanger 1003 which closes the heat pump circuit.

The temperature of the moist gas may vary as a function of the production site. However, the invention is implemented in a manner such that the temperature Tc of the natural gas 103 introduced into the guard bed is determined in a manner such that the natural gas 103 has a relative humidity of less than 90%, preferably less than 80%, highly preferably less than 75%. The temperature Tf corresponds to the temperature of the gas moving in the conduit 107.

The pressure of the heat transfer fluid on the side of the exchanger 1003, i.e. the evaporator, is selected such that the temperature of evaporation of the heat transfer fluid is in the range between the desired temperature Tf for the condensation point of the saturated gas 103 and 10° C. below Tf, preferably 2° C. to 5° C. below Tf.

The pressure of the heat transfer fluid entering the heat exchanger 1001, i.e. the condenser, is selected in a manner such that the temperature of condensation of the fluid is in the range between the desired temperature Tc for reheating the gas 103 and 10° C. above Tc, preferably between 2° C. and 5° C. above Tc.

In optimal manner, the difference between Tc and Tf is less than 50° C., and preferably Tc−Tf<30° C.; still more preferably, Tc−Tf<20° C., in order to obtain the best efficiency of the heat pump circuit.

Figure 2:
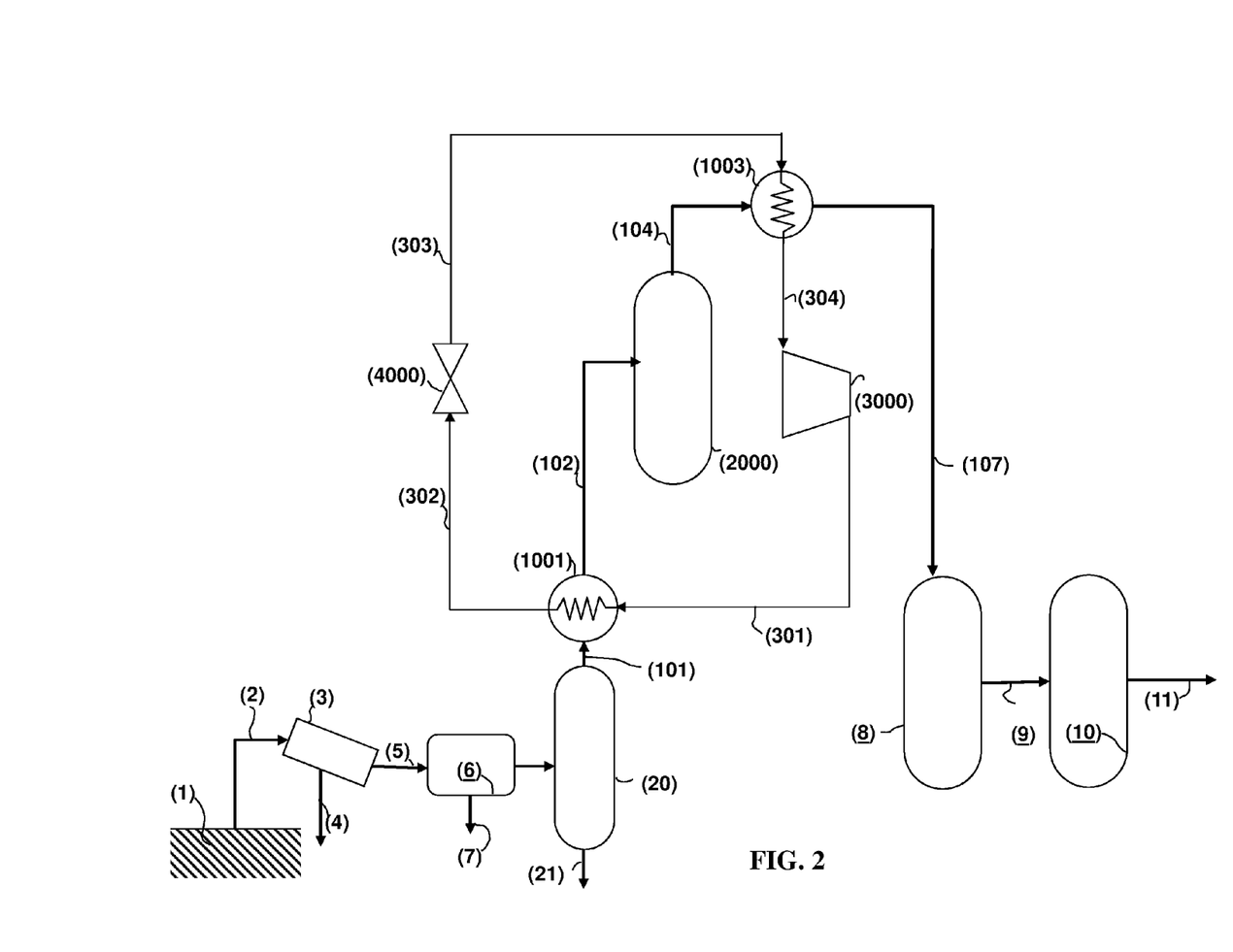
FIG. 2 represents a process for the production of a natural gas integrating the process of the invention.

FIG. 2 diagrammatically shows an example of the natural gas production process from extraction to the deacidification operation, in which the process of the invention is carried out. The references in FIG. 2 which are identical to the references in FIG. 1 designate the same elements.

The natural gas extracted from the underground deposit 1 is sent via the conduit 2 to a device 3 for trapping sludge, usually termed a slug catcher. The sludge is evacuated from the slug catcher via the conduit 4. The natural gas obtained from the device 3 is introduced via the conduit 5 into a primary gas-liquid separator 6 which can be used to eliminate a liquid stream comprising water and hydrocarbons via the conduit 7.

The moist gas is then introduced into a second gas-liquid separator 20. The function of this equipment is to separate the moist gas from droplets of liquid resulting from saturation of the condensables at the temperature of the system. This equipment 20 is, for example, a coalescer. The document EP 2 473 250 A2 describes an example of an embodiment of a coalescer. The coalescer 20 may be composed of a chamber provided with internal elements such as baffles and/or mats of fibres promoting condensation of droplets of liquid contained in the gas. Eliminating the droplets of liquid is preferable, as this prevents them from being present in a system where there is a saturated gas which also then entrains condensed liquids which will then become fixed on the mercury guard bed.

The liquid water is evacuated from the equipment 20 via the conduit 21. The gas, which has been freed from droplets in the equipment 20, is introduced into the heat exchanger 1001 via the conduit 101 for heating by heat exchange with the heat transfer fluid arriving via the conduit 301. The heated gas is evacuated from the exchanger 1001 via the conduit 102 for introduction into the mercury guard bed 2000. The gas, depleted in mercury, is evacuated from the equipment 2000 and is introduced into the heat exchanger 1003 via the conduit 104 for cooling by heat exchange with the heat transfer fluid arriving via the conduit 303. The reheated gas obtained from 1003 is introduced into a deacidification unit 8 via the conduit 107.

The heat transfer fluid obtained from the exchanger 1001 is introduced into the decompression device 4000 via the conduit 302. The decompressed fluid moving in the conduit 303 is reheated in the heat exchanger 1003 by heat exchange with the natural gas. The reheated heat transfer fluid is evacuated from the exchanger 1003 via the conduit 304 for introduction into the compressor 3000. The compressed fluid is introduced via the conduit 301 into the exchanger 1001 for cooling by heat exchange with the natural gas.

In the unit 8, the gas is brought into contact with a liquid amine solution which absorbs $H_2S$ and optionally $CO_2$ contained in the gas. The gas, which is depleted in acidic compounds, is introduced into the dehydration unit 10 via the conduit 9. In the unit 10, the natural gas may be brought into contact with a liquid glycol solution which absorbs the water contained in the gas. Alternatively, in the unit 10, the natural gas may be brought into contact with solid water-adsorbing masses. The gas evacuated from the unit 10 via the conduit 11 may be sold.

Figure 3:
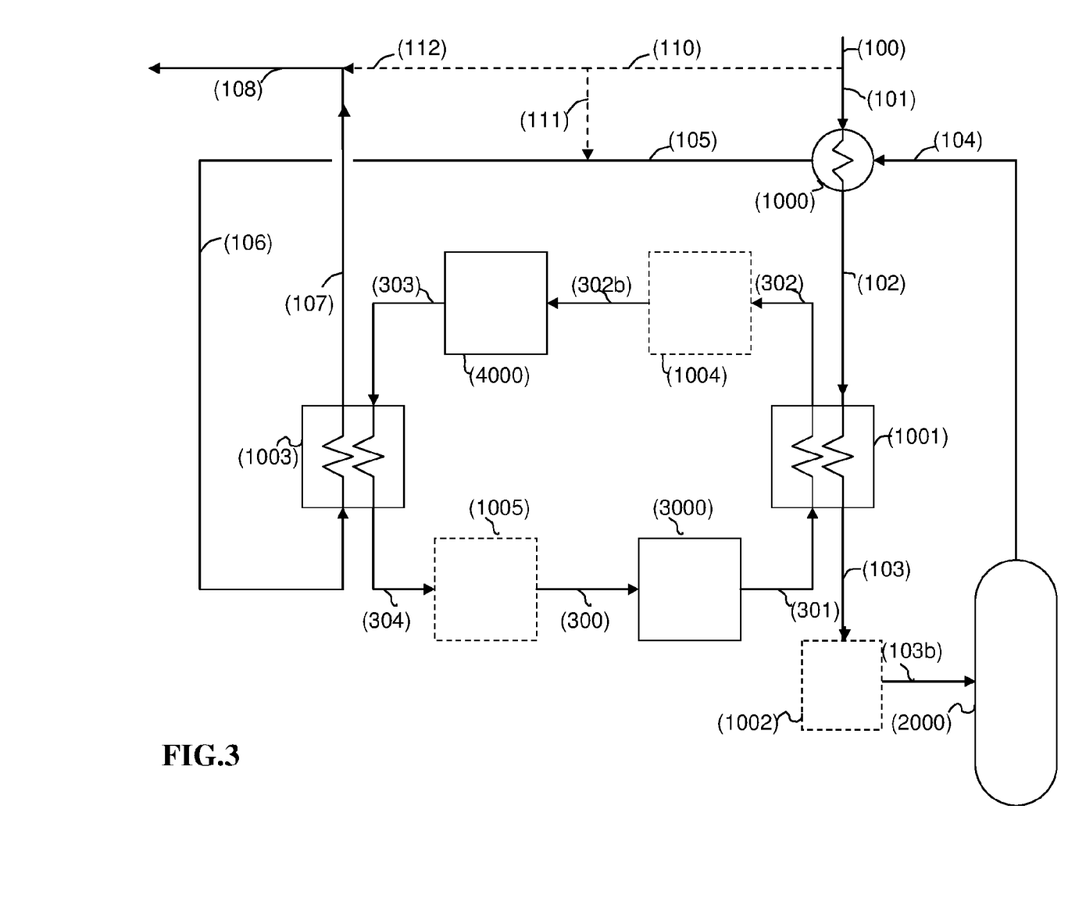
FIG. 3 represents a variation of the process of FIG. 1.

FIG. 3 represents a variation of the process described in FIG. 1, in which the thermal integration is optimized by using the heat exchanger 1000. The references in FIG. 3 which are identical to the references in FIG. 1 designate the same elements.

Referring to FIG. 3, the moist gas arriving via the conduit 101 is reheated in a heat exchanger 1000 by the heavy metal-depleted gas arriving via the conduit 104. The reheated moist gas is evacuated from the exchanger 1000 for introduction into the exchanger 1001 via the conduit 102. The heavy metal-depleted gas is evacuated from the exchanger 1000 via the conduit 105. Next, the gas may be mixed with a fraction of untreated gas arriving via the conduit 111, the mixture then being introduced into the heat exchanger 1003 via the conduit 106.

The heat exchanger 1000 can be used to recover the heat from the heavy metal-depleted gas and to optimize the thermodynamic cycle of the heat pump by reducing the quantity of heat transferred to the heat exchanger 1003 which condenses the heat transfer fluid.

The process of the invention is particularly suitable for the treatment of natural gas. However, the process of the invention may be applied to other types of gaseous effluents, such as combustion fumes, synthesis gas or indeed a gaseous hydrocarbon effluent, for example a shale gas, a coal gas, a gaseous oil cut or a refinery fuel gas, chlor-alkali plant exhaust gases, or rare earth production exhaust gases. The gaseous effluent comprises water in varying proportions which in particular depend on its origin and earlier treatments which it has undergone. Typically, the relative humidity of the fumes is in the range 30% to 100%.

The combustion fumes are in particular produced by the combustion of hydrocarbons, biogas, coal in a boiler or a combustion gas turbine, for example for the purposes of the production of electricity. These fumes are at a temperature in the range 20° C. to 60° C., a pressure in the range 1 to 5 bars (1 bar=0.1 MPa) and may comprise in the range 50% to 80% of nitrogen, in the range 5% to 40% of carbon dioxide, in the range 1% to 20% of oxygen, and several impurities such as $SO_x$ and $NO_x$, if they have not been eliminated upstream by a deacidification process. Synthesis gas contains carbon monoxide CO, hydrogen $H_2$ (generally in a $H_2$/CO ratio of 2), water vapour (generally at saturation at the temperature at which scrubbing is carried out) and carbon dioxide $CO_2$ (of the order of 10%). The pressure is generally in the range 20 to 30 bar, but may be up to 70 bar. It also further contains sulphur-containing impurities ($H_2S$, COS, etc), nitrogen-containing impurities ($NH_3$, HCN) and halogenated impurities. Depending on the positioning of the demercuration step in the synthesis gas purification chain, its relative humidity is in the range 5% to 100%.

The following examples demonstrate the advantages of the invention.

EXAMPLE 1 (CONTEXT)

In this example, two commercial mesoporous solids A and B were considered and used for demercuration and characterized by the pore volume distributions shown in Table 1.

TABLE 1

Proportion of pore types of solids A and B under consideration

| | % pore volume | |
| --- | --- | --- |
| | Solid A | Solid B |
| Micropores (d < 2 nm) | 0 | 0 |
| Mesopores (2 < d < 50 nm) | 49 | 60 |
| Macropores (d > 50 nm) | 51 | 40 | in which d corresponds to the pore diameter of the solid, measured using a mercury porosimetry method, for example the method described in the document by Rouquerol F.; Rouqerol J.; Singh K. Adsorption by powers & porous solids: Principle, methodology and applications, Academic Press, 1999.

Assuming that the pores are cylindrical, Kelvin's law (equation 2) can be applied to determine, as a function of the moisture content, the proportion of the total pore volume filled with liquid water. The assumed conditions were a fluid which completely wets the surface ($\theta=0$), a surface tension equal to that of an air/water system ($\gamma=67.9$ mN·m$^{-1}$ at T=50° C.) and the temperature T=50° C. The saturated vapour pressure $P_0$ of the water was determined using Antoine's law ($P_0=105.20389-1733.926/(T-39.485)$). The results of this calculation are shown in Table 2.

TABLE 2

Percentage of pore volume filled as a function of moisture content

| | % of total pore volume filled in the humidity range | |
| --- | --- | --- |
| Moisture content | Solid A | Solid B |
| $0 < P/P_0 < 25$ | 0 | 0 |
| $25 < P/P_0 < 50$ | 0.02 | 0.01 |
| $50 < P/P_0 < 70$ | 1.55 | 1.27 |
| $70 < P/P_0 < 80$ | 6.52 | 8.01 |
| $80 < P/P_0 < 90$ | 30.72 | 42.40 |
| $90 < P/P_0 < 99.9$ | 57.62 | 45.55 |

It can clearly be seen that the majority of the pores were not affected beyond a moisture content of approximately 80%. Beyond that, a substantial increase in the total pore volume filled with liquid water was observed, up to approximately 100% for moisture contents close to saturation.

Assuming a homologous distribution of the active phase over the surface of the support, it was possible to calculate the quantity of active phase rendered inactive, because it is inaccessible due to filling of the pores, as a function of the moisture content.

| | % of active phase which is inaccessible in the moisture content range | |
| --- | --- | --- |
| Moisture content | Solid A | Solid B |
| $0 < P/P_0 < 25$ | 0 | 0 |
| $25 < P/P_0 < 50$ | 0 | 1.10 |
| $50 < P/P_0 < 70$ | 7.06 | 5.08 |
| $70 < P/P_0 < 80$ | 21.29 | 23.03 |
| $80 < P/P_0 < 90$ | 46.17 | 58.75 |
| $90 < P/P_0 < 99.9$ | 25.48 | 12.04 |

In agreement with these data, a dynamic mercury capture test carried out on 1 g of capture mass A showed that the purification efficiency was 100% after one hour for a moisture content of 25%; 100% after one hour for a moisture content of 50%; 90% after one hour for a moisture content of 75%; 25% after one hour for a moisture content of 90% and 0% after one hour for a moisture content of 100%.

In agreement with these data, a dynamic mercury capture test carried out on 1 g of capture mass B showed that the purification efficiency was 100% after one hour for a moisture content of 25%; 100% after one hour for a moisture content of 50%; 90% after one hour for a moisture content of 75%; 15% after one hour for a moisture content of 90% and 0% after one hour for a moisture content of 100%.

The function of the capture masses was thus only altered to a moderate extent up to a moisture content of 80%. A fortiori, in order to provide a safety margin, it is recommended to maintain the relative moisture content of the gas to be treated in the demercuration step at a relative humidity of less than 75%.

EXAMPLE 2 (NOT IN ACCORDANCE WITH THE INVENTION)

This example is given by way of comparison. In this example, the water content of a moist gas saturated with water was to be reduced to below 75% in accordance with that disclosed in Example 1.

It was intended to evaluate the quantity of energy necessary to reduce the relative moisture content of a natural gas saturated with water to 75% relative humidity by reheating the whole of the stream to be treated. This was based on the following initial conditions: the moist gas was a natural gas saturated with water produced at 70 bar and 30° C. and with a dry flow rate of 140000 Nm$^3$/h. Its dry composition is given in Table 3.

TABLE 3

Composition of dry gas

| Compound | % mol |
|---|---|
| $CO_2$ | 10.7 |
| $O_2$ | 0.8 |
| $N_2$ | 0.9 |
| $C_1$ | 77.2 |
| $C_2$ | 6.6 |
| $C_3$ | 2.2 |
| $iC_4$ | 0.2 |
| $nC_4$ | 0.5 |
| $iC_5$ | 0.2 |
| $nC_5$ | 0.3 |
| $C_6$ | 0.2 |
| $C_7$ | 0.1 |
| $C_8$ | 0.1 |

When this gas was saturated with water, its water vapour content was 880 ppm mol.

The results presented below result from a simulation using Aspen Hysys v7.2 software. The SRK (Soave-Redlich-Kwong) model was the thermodynamic model which was selected.

The temperature at which a relative humidity of 75% was obtained was 35.5° C. The thermal power necessary to heat the flow of gas from 30° C. to 35.5° C. was 500 kWth (kilowatt thermal).

Next, the reheated gas was treated on a mercury guard bed.

EXAMPLE 3 (IN ACCORDANCE WITH THE INVENTION)

This example in accordance with the invention was aimed at reducing the water content of a moist gas below 75% in agreement with the disclosure in Examples 1 and 2 in order to prevent any major phenomena of capillary condensation in the mercury capture masses as described in Example 1. The unit for partially drying gas located upstream of the demercuration unit is described in FIG. 3, in which the heat exchangers 1002, 1004 and 1005 were not used.

The results presented below result from a simulation using Aspen Hysys v7.2 software. The SRK (Soave-Redlich-Kwong) model was the thermodynamic model which was selected.

The following initial conditions were employed: the moist gas was a natural gas saturated with water produced at 70 bar and 30° C. with a dry flow rate of 140000 Nm$^3$/h. Its dry composition is given in Table 3 of Example 2.

When the gas was saturated with water, its water vapour content was 880 ppm mol.

In this example, the whole of the feed 100 was treated. Thus, the stream of gas in the conduit 110 was zero. The moist gas 101 entered the feed-effluent exchanger 1000 and exchanged 276 kWth with the stream 104 which entered the exchanger at 35.5° C. This produced a stream 102 of reheated gas to be treated at 33° C. and a stream of cooled treated gas 105 at 32.4° C. The reheated gas to be treated 102 entered the condenser of the heat pump system 1001 and exchanged 232 kWth with the heat transfer fluid 301. This produced a stream of moist gas to be treated 103 at a temperature of 35.5° C. The relative humidity of 103 was 74.5% of saturation which under these pressure and temperature conditions would correspond to 1181 ppm mol. The gas was then treated on the capture mass 2000. This produced a treated gas 104 which would give up heat in the heat exchanger 1000 to the entering gas in order to produce a partially cooled treated gas 105 at 32.4° C. In the event that the whole of the feed is treated, the stream 111 is zero in this example and the stream moving in the conduit 106 has the same composition and is under the same conditions as that moving in the conduit 105. The stream 106 gives up 220 kWth to the heat transfer fluid 303 in the evaporator 1003 of the heat pump system. The temperature of the treated gas 107, and thus of the gas produced 108 because in this example the stream 112 was zero, was 30.2° C.

The heat pump circuit started with a vaporized heat transfer fluid 300 composed of butane at 27.7° C. and 2.64 bar which moved at 39.2 kmol/h. Its pressure was raised using a compressor 3000. This corresponded to a consumption of 11.3 kWe (electrical) with a compression efficiency of 75%. This produced a fluid 301 at 3.65 bar and 38.5° C. This fluid was condensed at 1001 to produce a stream of liquid butane 302 at 38.5° C. The condensed fluid was decompressed in the valve 4000 to produce a stream of partially vaporized butane at 27.7° C. and 2.64 bar. This fluid was then vaporized in the heat exchanger 1003 to recover the fluid moving in the conduit 3000 and close the circuit of the heat pump.

In summary, the stream of moist natural gas 100 received a total of 508 kWth for an energy consumption of 11.3 kWe. If it is assumed that this electricity is produced by combustion of gas in a turbine with a net electrical efficiency of 40%, this would correspond to an equivalent consumption of 28 kWth of primary energy such as that used in Example 2 to produce the thermal power.

EXAMPLE 4 (IN ACCORDANCE WITH THE INVENTION)

This example in accordance with the invention was aimed at reducing the water content of a moist gas below 75% in agreement with the disclosure in Examples 1 and 2 in order to prevent any major phenomena of capillary condensation in the mercury capture masses as described in Example 1. The unit for partially drying gas located upstream of the demercuration unit is described in FIG. 1, in which the heat exchangers 1002, 1004 and 1005 were not used.

The results presented below result from a simulation using Aspen Hysys v7.2 software. The SRK (Soave-Redlich-Kwong) model was the thermodynamic model which was selected.

The following initial conditions were employed: the moist gas was a natural gas saturated with water produced at 70 bar and 30° C. with a dry flow rate of 140000 $Nm^3/h$. Its dry composition is given in Table 3 of Example 2.

When the gas was saturated with water, its water vapour content was 880 ppm mol.

In this example, the whole of the feed 100 was treated. Thus, the stream of gas in the conduit 110 was zero. The initial feed which moved in the conduit 100 then 101 was a saturated moist gas (880 ppm mole of water) which was reheated in the condenser 1001 of a heat pump system by transferring 501 kWth with a heat transfer fluid (this value differs from Example 1 because of a smaller pressure drop due to missing out one exchanger). This produced a stream 102 of reheated moist gas at 35.5° C. at 74.8% saturation (which is 1177 ppm mol under these conditions). The treated gas 106 restored 477 kWth to the heat transfer fluid in the evaporator 1003. The result was a gas 108 produced at 30.2° C.

In the heat pump circuit, the vaporized heat transfer fluid 300 was composed of butane at 27.7° C. and 2.64 bar which moved at 85 kmol/h. Its pressure was raised using a compressor 3000. This corresponded to a consumption of 24.5 kWe (electrical) with a compression efficiency of 75%. This produced a fluid 301 at 3.65 bar and 38.5° C. This fluid was condensed in the exchanger 1001 to produce a stream of liquid butane 302 at 38.5° C. The condensed fluid was decompressed by the valve 4000 to produce a stream of partially vaporized butane at 27.7° C. and 2.64 bar. This fluid was then vaporized in the heat exchanger 1003 to recover the fluid moving in the conduit 300 and close the circuit of the heat pump.

In summary, the stream of moist natural gas 100 received a total of 501 kWth for an energy consumption of 24.5 kWe. If it is assumed that this electricity is produced by combustion of gas in a turbine with a net electrical efficiency of 40%, this would correspond to an equivalent consumption of 61 kWth of primary energy such as that used in Example 2 to produce the thermal power.

CONCLUSIONS FOR EXAMPLES 2, 3 AND 4

In Example 2 (not in accordance with the invention), the thermal power consumed to obtain 75% relative humidity was 500 kWth.

In Example 4 (in accordance with the invention), the equivalent thermal power to obtain 74.8% relative humidity was 61 kWth.

In Example 3 (in accordance with the invention), the equivalent thermal power to obtain 74.5% relative humidity was 28 kWth.

Using a heat pump system in accordance with the invention means that the energy consumed can be reduced by a factor of at least 8 compared with the solution described in Example 2, and by a factor of close to 20 if it is supplemented by a feed-effluent exchange.

The invention claimed is:

1. A process for capturing at least one heavy metal, selected from mercury and arsenic, contained in a moist gas comprising water vapour, in which the following steps are carried out:
   extracting a natural gas from an underground deposit; then
   introducing the natural gas into a sludge elimination device; then
   introducing the natural gas into a gas-liquid separation device; then sending the natural gas to the following step a);
   a) heating (1001) the moist gas by heat exchange with a compressed heat transfer fluid obtained in step e) in order to obtain a condensed heat transfer fluid and a gas reheated to a temperature Tc with a reduced water vapour content;
   b) bringing the reheated gas with a reduced water vapour content obtained in step a) into contact with a heavy metal capture mass (2000) in order to obtain a gas which is depleted in heavy metal, whereby the water vapour content of the moist gas was sufficiently reduced in step a) so that capillary condensation on the heavy metal capture mass is reduced or avoided;
   c) decompressing (4000) the cooled heat transfer fluid obtained in step a);
   d) cooling (1003) the gas depleted in heavy metal by heat exchange with the heat transfer fluid produced in step c) in order to obtain a cooled gas at a temperature Tf, the heat transfer fluid being vaporized during step d); and
   e) compressing (3000) the vaporized heat transfer fluid obtained in step d) in a manner such as to obtain a compressed heat transfer fluid, the compressed heat transfer fluid being recycled to step a) to complete a heat pump circuit;
   then, after step e), the following steps are carried out:
   eliminating at least a portion of the $H_2S$ and $CO_2$ contained in the gas depleted in heavy metal; and then
   eliminating at least a portion of the water vapour contained in the gas depleted in heavy metal.

2. The process according to claim 1 in which, before carrying out step a), a heat exchange is carried out between the moist gas and the gas depleted in heavy metal obtained from step b).

3. The process according to claim 1, in which the temperature Tc is determined in a manner such that the reheated gas with a reduced water vapour content obtained in step a) has a relative humidity of less than 90%.

4. The process according to claim 1, in which the difference between Tc and Tf is less than 50° C.

5. The process according to claim 1, in which the capture mass comprises an active phase selected from at least one metallic sulphide based on a metal selected from the group constituted by copper (Cu), chromium (Cr), manganese (Mn), iron (Fe), cobalt (Co) and nickel (Ni).

6. The process according to claim 1, in which the capture mass comprises an active phase composed of elemental sulphur.

7. The process according to claim 1 in which, when the moist gas contains $H_2S$, the capture mass comprises an active phase composed of at least one metallic oxide of a metal selected from copper (Cu), chromium (Cr), manganese (Mn), iron (Fe), cobalt (Co) and nickel (Ni).

8. The process according to claim 1, in which the capture mass comprises an active phase composed of at least one metallic oxide of a metal selected from copper (Cu) and lead (Pb).

9. The process according to claim 5, in which the active phase is distributed over a porous support, the porous support being selected from the group constituted by aluminas, phosphorus-containing aluminas, silica-aluminas, silicas, clays, activated carbons, zeolites, titanium oxides, zirconium oxides and mixtures thereof.

10. The process according claim 1, in which the heat transfer fluid is selected from hydrocarbons containing 1 to 7 carbon atoms and optionally one or more heteroatomic ligands.

11. The process according to claim 1, in which at least one of the following operations is carried out:
- before carrying out step e), carrying out a supplemental step for heating the vaporised heat transfer fluid obtained in step d);
- before carrying out step b), carrying out a supplemental step for further heating the reheated gas obtained in step a);
- before carrying out step c), carrying out a supplemental step for further cooling the cooled heat transfer fluid obtained in step a).

12. The process according to claim 11, in which an exchange of heat of the vaporized heat transfer fluid obtained in step d) with the cooled heat transfer fluid obtained in step a) is carried out.

13. The process according to claim 1, in which the moist gas is selected from one of the following gases: a natural gas, a shale gas, a coal gas, a synthesis gas, combustion fumes, a gaseous hydrocarbon effluent, chlor-alkali plant exhaust gases, and rare earth production plant exhaust gases.

14. The process according to claim 1, in which the moist gas is introduced into step a) at a pressure in the range of 2 to 10 MPa, at a temperature in the range of 20° C. to 80° C., and at a relative humidity in the range of 30% to 100%.

15. The process according to claim 1, in which the moist gas introduced into step a) contains mercury in a proportion of between 10 nanograms and 1 gram of mercury per $Nm^3$ of the moist gas.

16. The process according to claim 1, in which, in step a) the heat exchange heats the moist gas by 1° C. to 20° C.

17. The process according to claim 1, in which the reheated gas with a reduced water vapour content obtained in step a) has a relative humidity of less than 80%.

18. The process according to claim 1, in which the reheated gas with a reduced water vapour content obtained in step a) has a relative humidity of less than 75%.

* * * * *